(12) United States Patent
Nam et al.

(10) Patent No.: US 11,909,425 B2
(45) Date of Patent: Feb. 20, 2024

(54) FRONT END MODULE FOR SUPPORTING MULTIPLE COMMUNICATIONS AND ELECTRONIC DEVICE HAVING SAME

(71) Applicant: SAMSUNG ELECTRONICS CO., LTD., Suwon-si (KR)

(72) Inventors: Janghyun Nam, Suwon-si (KR); Kyuhyuck Kwak, Suwon-si (KR); Hyoseok Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 17/832,938

(22) Filed: Jun. 6, 2022

(65) Prior Publication Data

US 2022/0302933 A1    Sep. 22, 2022

Related U.S. Application Data

(63) Continuation of application No. PCT/KR2021/000755, filed on Jan. 19, 2021.

(30) Foreign Application Priority Data

Jan. 22, 2020    (KR) .................. 10-2020-0008378

(51) Int. Cl.
*H04B 1/38* (2015.01)
*H04B 1/00* (2006.01)
*H04B 1/44* (2006.01)

(52) U.S. Cl.
CPC ............. *H04B 1/0064* (2013.01); *H04B 1/44* (2013.01)

(58) Field of Classification Search
CPC ................................ H04B 1/0064; H04B 1/44
(Continued)

(56) References Cited

U.S. PATENT DOCUMENTS 8,467,738 B2   6/2013   Gorbachov
8,804,624 B1   8/2014   Lee et al.
(Continued)

FOREIGN PATENT DOCUMENTS

JP    2013-239775    11/2013
KR    10-1341509    12/2013

OTHER PUBLICATIONS

International Search Report for PCT/KR2021/000755 dated Apr. 21, 2021, 4 pages.
(Continued)

*Primary Examiner* — Zewdu A Kassa
(74) *Attorney, Agent, or Firm* — Nixon & Vanderhye, P.C.

(57) ABSTRACT

In an electronic device and a method of operating the electronic device according to various embodiments, a front end module of the electronic device comprises: a first terminal connected to a transmission port for a first communication; a second terminal connected to a reception port for the first communication; a first amplifier connected to the first terminal; an amplifier circuit including a second amplifier and a bypass line connected in parallel with the second amplifier; a first switch connecting the amplifier circuit to one from among the second terminal, a third terminal connected to one of a reception port for a second communication or a transmission port for the second communication, and a fourth terminal connected to one of the reception port for the second communication or the transmission port for the second communication; and a second switch connecting an antenna to one of the amplifier circuit and the first amplifier, wherein a transmission signal of the second communication may be configured to be transmitted to the antenna through the bypass line connected in parallel with the second amplifier included in the amplifier circuit, a reception signal of the second communication may be
(Continued)

configured to be transmitted to the reception port for the second communication through the second amplifier.

15 Claims, 8 Drawing Sheets

(58) Field of Classification Search
USPC .......................................... 375/219, 295, 316
See application file for complete search history.

(56) References Cited

U.S. PATENT DOCUMENTS

| | | |
|---|---|---|
| 9,246,522 B1 | 1/2016 | Wong et al. |
| 2015/0055733 A1 | 2/2015 | Asano et al. |
| 2018/0062694 A1 | 3/2018 | Emmanuel |
| 2018/0241369 A1* | 8/2018 | Ghim ................ H04W 72/0453 |
| 2018/0262231 A1 | 9/2018 | Pusl, III et al. |

OTHER PUBLICATIONS

Written Opinion of the ISA for PCT/KR2021/000755 dated Apr. 21, 2021, 3 pages.

* cited by examiner

FRONT END MODULE FOR SUPPORTING MULTIPLE COMMUNICATIONS AND ELECTRONIC DEVICE HAVING SAME

CROSS-REFERENCE TO RELATED APPLICATIONS

This application is a continuation of International Application No. PCT/KR2021/000755 designating the United States, filed on Jan. 19, 2021, in the Korean Intellectual Property Receiving Office and claiming priority to Korean Patent Application No. 10-2020-0008378, filed on Jan. 22, 2020, in the Korean Intellectual Property Office, the disclosures of which are incorporated by reference herein in their entireties.

BACKGROUND

Field

The disclosure relates to a front end module for supporting multiple communication types and an electronic device having the front end module.

Description of Related Art

Various electronic devices, such as a smart phone, a tablet PC, a portable multimedia player (PMP), a personal digital assistant (PDA), a laptop personal computer (laptop PC), and a wearable device, have been spread.

Recently, an electronic device supports cellular communication including new radio (NR), long-term evolution LTE), $3^{rd}$ generation cellular communication, or $2^{nd}$ generation cellular communication, and short-range wireless communication including Wi-Fi, Bluetooth, or ultra wideband (UWB), and whenever supported communication types are increased, the number of front end modules or antennas for receiving or outputting signals corresponding to the supported communication types may be increased.

Recently, in order to support various communication types, the number of antennas or front end modules for receiving or outputting signals corresponding to the communication types may be increased as the communication types being supported by an electronic device are increased. In case that the number of antennas or front end modules is increased, a space for disposing the antennas or front end modules in the electronic device may be increased. From the viewpoint of the limited size of the electronic device, an increase of the disposition space of the antennas or front end modules may cause reduction of the disposition space of other components.

Since the space for disposing the antennas or the front end modules in the electronic device is limited, a distance between the antennas may be reduced depending on the increase of the number of antennas. In case that the distance between the antennas is reduced, interference may occur between the antennas, and this may cause the communication performance to be degraded.

SUMMARY

Embodiments of the disclosure provide a front end module and an electronic device having the front end module that can improve the communication performance, and can reduce the space occupied by the components by commonly using antennas or front end modules for communications having partially overlapping frequency bands among various communication types.

A front end module according to various example embodiments of the disclosure may include: a first terminal connected to a transmission port for a first communication; a second terminal connected to a reception port for the first communication; a first amplifier connected to the first terminal; an amplifier circuit including a second amplifier and a bypass line connected in parallel to the second amplifier; a first switch configured to connect the amplifier circuit to one of the second terminal, a third terminal connected to one of a reception port or a transmission port for a second communication, or a fourth terminal connected to one of the reception port or the transmission port for the second communication; and a second switch configured to connect an antenna to one of the amplifier circuit or the first amplifier, wherein a transmission signal of the second communication is configured to be transmitted to the antenna through the bypass line connected in parallel to the second amplifier included in the amplifier circuit, and a reception signal of the second communication is configured to be transmitted to the reception port of the second communication through the second amplifier.

An electronic device according to various example embodiments of the disclosure may include: a first antenna; a first communication circuit including a transmission port for a first communication configured to output a transmission signal of the first communication and a reception port for the first communication configured to receive a reception signal of the first communication; a second communication circuit including a transmission port for a second communication configured to output a transmission signal of the second communication and a reception port of the second communication configured to receive a reception signal of the second communication; and a front end module comprising circuitry electrically connected to the first communication circuit and the first antenna, wherein the front end module includes: a first terminal connected to the transmission port for the first communication; a second terminal connected to the reception port for the first communication; a first switch configured to connect an amplifier circuit to one of the second terminal, a third terminal connected to the reception port for the second communication, or a fourth terminal connected to the transmission port for the second communication; a second switch configured to connect the first antenna to one of the amplifier circuit or the first terminal; an amplifier circuit connected between the first switch and the second switch, wherein a first processor is configured to control the front end module to transmit the transmission signal of the second communication to the first antenna through a bypass line connected in parallel to an amplifier included in the amplifier circuit.

According to the front end module and the electronic device including the front end module according to the various example embodiments of the disclosure, the same front end module can be used in performing the first communication and the second communication of which partial frequency bands overlap each other. Accordingly, in comparison to an arrangement in which a front end module supporting the first communication and a front end module supporting the second communication are disposed in all, a space occupied by the front end module can be reduced.

According to the front end module and the electronic device including the front end module according to the various example embodiments of the disclosure, the transmission signal of the second communication can be transmitted to the antenna using the bypass path implemented in the amplifier circuit used to amplify the reception signal of the first communication. Through the above-described method, the front end module does not require a separate path being used to transmit the second communication, and thus the size of the front end module can be reduced.

According to the front end module and the electronic device including the front end module according to the various example embodiments of the disclosure, the communication processor can perform a control of the front end module while performing the second communication. Through the above-described method, a path for transmitting a control signal between a separate circuit to control the second communication and the front end module can be omitted, and thus the circuit design can be facilitated.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
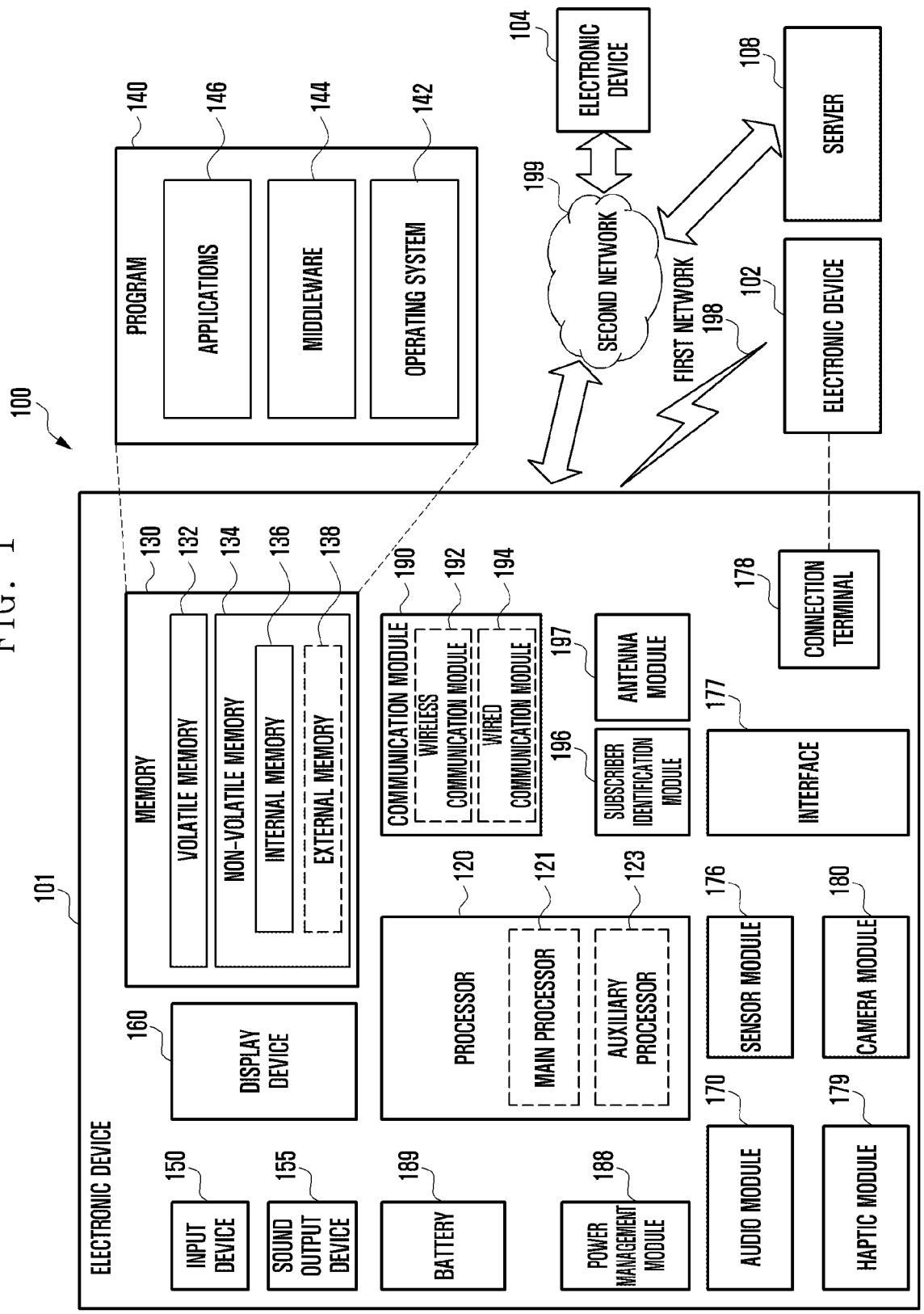
FIG. 1 is a block diagram illustrating an example electronic device according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the 11 connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196. The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
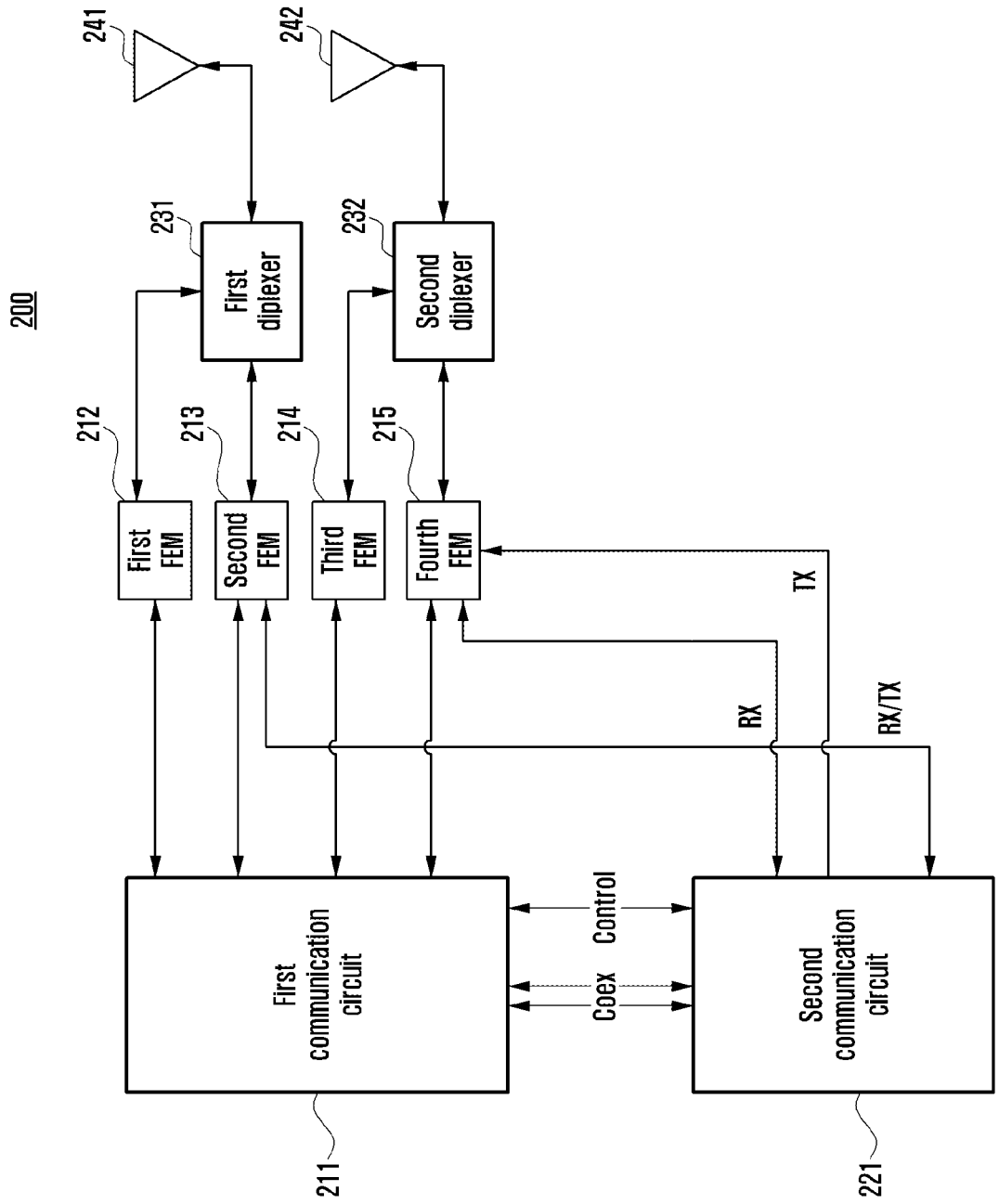
FIG. 2A is a block diagram illustrating an example configuration of a communication circuit of an electronic device according to various embodiments.

FIG. 2A is a block diagram illustrating an example configuration of an electronic device according to various embodiments.

With reference to FIG. 2A, an electronic device (e.g., electronic device 101 of FIG. 1) according to various embodiments of the disclosure may include a first communication circuit 211, a second communication circuit 221, a first diplexer 231, a second diplexer 232, a first antenna 241, and a second antenna 242.

According to various embodiments of the disclosure, the electronic device 101 may include various components (e.g., front end module, amplifier, switch, or splitter) for performing reception or transmission of signals through a first communication. The first communication may refer, for example, to, one of various wireless communications supported by the electronic device 101. For example, the first communication may be Wi-Fi communication supported by the electronic device 101. The electronic device 101 may include the first communication circuit 211 configured to control transmission or reception of the signal through the first communication.

According to various embodiments of the disclosure, the electronic device 101 may include various components (e.g., amplifier, switch, or splitter) for performing reception or transmission of signals through a second communication. The second communication may refer, for example, to one of various wireless communications, which is supported by the electronic device 101, and which is different from the first communication. For example, the second communication may be ultra wideband communication (UWB) supported by the electronic device 101. The electronic device 101 may include the second communication circuit 221 configured to control transmission or reception of the signal through the second communication. For example, the second communication circuit 221 may include at least one transmission port of the second communication to output a transmission signal of the second communication and at least one reception port of the second communication to receive a reception signal of the second communication.

According to various embodiments of the disclosure, the frequency band of the first communication and the frequency band of the second communication may overlap each other at least partially. For example, in case that the first communication is the communication supporting IEEE 802.11 ax (or Wi-Fi 6), the frequency band of the first communication may be 5.15 GHz to 7.125 GHz. For example, in case that the second communication is the UWB, the frequency band of the second communication may be 6.24 GHz to 8.24 GHz. The frequency band of the first communication and the frequency band of the second communication may overlap each other within the frequency of 6.24 GHz to 7.125 GHz.

According to various embodiments of the disclosure, the electronic device 101 may include the first communication circuit 211, the second communication circuit 221, a first front end module (FEM) 212, a second front end module 213, a third front end module 214, and/or a fourth front end module 215.

According to various embodiments of the disclosure, the first communication circuit 211 may control the transmission or the reception of the signals through the first communication. The first communication circuit 211 may be electrically connected to the first front end module 212 and/or the second front end module 213.

According to various embodiments of the disclosure, the first front end module 212 may amplify the signal received through the first antenna 241, or may transmit the reception signal of the first communication, from which noise has been removed, to the first communication circuit 211. The first front end module 212 may amplify the transmission signal of the first communication, having been transmitted by the first communication circuit 211, or may process the removal of the noise. The processed transmission signal of the first communication may be output through the first antenna 241 via the first diplexer 231. The frequency band of the signal being received or output by the first front end module 212 may be defined as a first frequency band. For example, the first frequency band may be a partial frequency band (e.g., 2.4 GHz to 2.5 GHz) of the frequency band of the first communication.

According to various embodiments of the disclosure, the second front end module 213 may amplify the signal received through the first antenna 241, or may transmit the reception signal of the first communication, from which the noise has been removed, to the first communication circuit 211. The second front end module 213 may amplify the transmission signal of the first communication, having been transmitted by the first communication circuit 211. The processed transmission signal of the first communication may be output through the first antenna 241 via the first diplexer 231. The frequency band of the signal being received or output by the second front end module 213 may be defined as a second frequency band. For example, the second frequency band may be a frequency band including a partial frequency band (e.g., 5.15 GHz to 7.125 GHz) of the frequency band of the first communication and a frequency band (6.24 GHz to 8.24 GHz) of the second communication.

According to various embodiments of the disclosure, the first antenna 241 may receive a signal being transmitted by an external electronic device. The first antenna 241 may receive or output the signal of the frequency band of the first communication (e.g., 2.4 GHz to 2.5 GHz, and 5.15 GHz to 7.25 GHz) and the signal of the second frequency band (e.g., 6.24 GHz to 8.25 GHz). The first diplexer 231 may filter the signal received by the first antenna 241 according to the frequency band. According to an embodiment, the first diplexer 231 may transmit the signal of the first frequency band among the received signals to the first front end module 212. According to an embodiment, the first diplexer 231 may transmit the signal of the second frequency band among the received signals to the second front end module 213.

According to various embodiments of the disclosure, the second front end module 213 may support transmission or reception of the signals of at least a part of the frequency band of the first communication and of at least a part of the frequency band of the second communication. In an embodiment, the second front end module 213 may be connected to the first communication circuit 211 controlling the transmission or reception of the signal through the first communication and the second communication circuit 221 controlling the transmission or reception of the signal through the second communication. In an embodiment, the second front end module 213 may process (e.g., amplify or remove noise from) the signal of the frequency band of the first communication, being received by the first antenna 241, and may transmit the processed signal to the first processor 211. The second front end module 213 may process (e.g., amplify or remove noise from) the signal of the frequency band of the second communication, being received by the first antenna 241, and may transmit the processed signal to the second communication circuit 221. From the viewpoint of the signal transmission, the second front end module 213 may process (e.g., amplify) the signal transmitted by the first communication circuit 211, and may transmit the processed signal to the first antenna 241. The second front end module 231 may process (e.g., amplify) the signal being transmitted by the second communication circuit 221, and may transmit the processed signal to the first antenna 241.

According to various embodiments of the disclosure, the third front end module 214 may amplify the signal received through the second antenna 242, or may transmit the reception signal of the first communication, from which the noise has been removed, to the first communication circuit 211. The third front end module 214 may amplify the transmission signal of the first communication, having been transmitted by the first communication circuit 211. The processed transmission signal of the first communication may be output through the second antenna 242 via the second diplexer 232. In an embodiment, the frequency band of the signal being received or output by the third front end module 214 may be substantially the same as the first frequency band that is the frequency band of the signal being received or output by the first front end module 212.

According to various embodiments of the disclosure, the fourth front end module 215 may amplify the signal received through the second antenna 242, or may transmit the reception signal of the first communication, from which the noise has been removed, to the first communication circuit 211. The fourth front end module 215 may amplify the transmission signal of the first communication, having been transmitted by the first communication circuit 211. The processed transmission signal of the first communication may be output through the second antenna 242 via the second diplexer 232. In an embodiment, the frequency band of the signal being received or output by the fourth front end module 215 may be substantially the same as the second frequency band that is the frequency band of the signal being received or output by the second front end module 213. For example, the second frequency band may be a frequency band including the partial frequency band (e.g., 5.15 GHz to 7.125 GHz) of the frequency band of the first communication and a part of the frequency band (6.24 GHz to 8.24 GHz) of the second communication.

According to various embodiments of the disclosure, the second antenna 242 may receive a signal being transmitted by an external electronic device. The second antenna 242 may receive or output the signal of the frequency band of the first communication (e.g., 2.4 GHz to 2.5 GHz, and 5.15

GHz to 7.25 GHz) and the signal of the frequency band of the second communication (e.g., 6.24 GHz to 8.25 GHz). The second diplexer 232 may filter the signal received by the second antenna 242 according to the frequency band. According to an embodiment, the second diplexer 232 may transmit the signal of the first frequency band among the received signals to the third front end module 214. According to an embodiment, the second diplexer 232 may transmit the signal of the second frequency band among the received signals to the fourth front end module 215.

According to various embodiments of the disclosure, the fourth front end module 215 may support the transmission or reception of the signals of at least a part of the frequency band of the first communication and of at least a part of the frequency band of the second communication. In an embodiment, the fourth front end module 215 may be connected to the first communication circuit 211 controlling the transmission or reception of the signal through the first communication and the second communication circuit 221 controlling the transmission or reception of the signal through the second communication. In an embodiment, the fourth front end module 215 may process (e.g., amplify or remove noise from) the signal of the frequency band of the first communication, being received by the second antenna 242, and may transmit the processed signal to the first communication circuit 211. The fourth front end module 215 may process (e.g., amplify or remove noise from) the signal of the frequency band of the second communication, being received by the second antenna 242, and may transmit the processed signal to the second communication circuit 221. In an embodiment, the fourth front end module 215 may process (e.g., amplify) the signal transmitted by the first communication circuit 211, and may transmit the processed signal to the second antenna 242. The fourth front end module 235 may process (e.g., amplify) the signal being transmitted by the second communication circuit 221, and may transmit the processed signal to the second antenna 242.

According to various embodiments of the disclosure, the second communication circuit 221 may perform the second communication using the front end module (e.g., the second front end module 213 or the fourth front end module 215) being used by the first communication circuit 211. In an embodiment, the second communication circuit 221 may perform the second communication using the antenna (e.g., the first antenna 241 or the second antenna 242) being used by the first communication circuit 211. As described above, since the first communication circuit 211 and the second communication circuit 221 use the same front end module (e.g., the second front end module 213 or the fourth front end module 215), the disposition space of the front end module can be reduced.

According to various embodiments of the disclosure, the first communication circuit 211 may control the second front end module 213 or the fourth front end module 215 based on the signal being transmitted by the second communication circuit 221. According to an embodiment, the second communication circuit 221 may determine to transmit the signal through the second communication, and may transmit a request signal for requesting transmission of the transmission signal through the second communication to the first communication circuit 211. The first communication circuit 211 may control the second front end module 213 or the fourth front end module 215 so that the second front end module 213 or the fourth front end module 215 transmits the transmission signal through the second communication to the first antenna 241 or the second antenna 242 in response to the reception of the request signal from the second communication circuit 221. According to an embodiment, the second communication circuit 221 may determine to receive the signal through the second communication, and may transmit a signal for requesting the reception of the signal through the second communication to the first communication circuit 211. The first communication circuit 211 may control the second front end module 213 or the fourth front end module 215 so that the second front end module 213 or the fourth front end module 215 receives the transmission signal through the second communication in response to the reception of the request signal from the second communication circuit 221. Hereinafter, embodiments related to the structure of the second front end module 213 or the fourth front end module 215 and a detailed control method thereof will be described with reference to FIGS. 3 to 7.

Figure 2B:
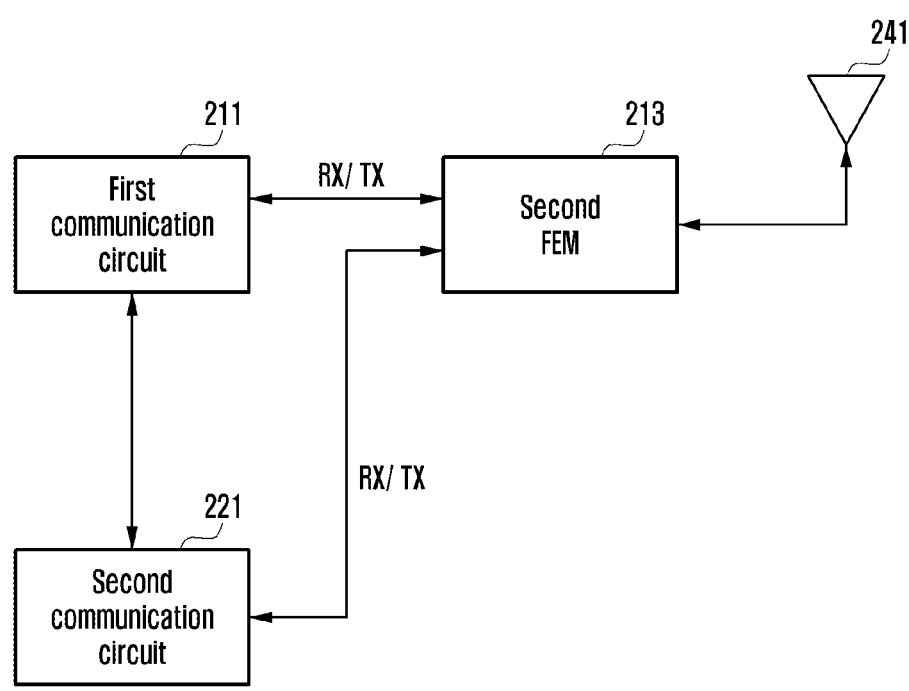
FIG. 2B is a block diagram illustrating an example configuration of an electronic device according to various embodiments.

FIG. 2B is a block diagram illustrating an example configuration of an electronic device according to various embodiments.

FIG. 2B illustrates an embodiment in which the electronic device 101 outputs the transmission signal of the first communication and/or the transmission signal of the second communication, or receives the reception signal of the first communication and/or the reception signal of the second communication using the one first antenna 241.

With reference to FIG. 2B, the electronic device (e.g., electronic device 101 of FIG. 1) according to various embodiments of the disclosure may include the second front end module 213, the first communication circuit 211, the second communication circuit 221, and the first antenna 241.

According to various embodiments of the disclosure, the first communication circuit 211 may control the transmission or the reception of the signal through the first communication. The first communication circuit 211 may be electrically connected to the second front end module 213.

According to various embodiments of the disclosure, the second communication circuit 221 may perform the second communication using the second front end module 213 being used by the first communication circuit 211. In an embodiment, the second communication circuit 221 may perform the second communication using the first antenna 241 being used by the first communication circuit 211.

According to various embodiments of the disclosure, the first antenna 241 may receive the signal being transmitted by an external electronic device. The first antenna 241 may receive or transmit the signal of the frequency band of the first communication (e.g., 2.4 GHz to 2.5 GHz, and 5.15 GHz to 7.25 GHz) and the signal of the second frequency band (e.g., 6.24 GHz to 8.25 GHz).

According to various embodiments of the disclosure, the second front end module 213 may amplify the signal received through the first antenna 241, or may transmit the reception signal of the first communication, from which the noise of the received signal has been removed, to the first communication circuit 211. The second front end module 213 may amplify the transmission signal of the first communication, being transmitted by the first communication circuit 211. The processed transmission signal of the first communication may be transmitted through the first antenna 241.

According to various embodiments of the disclosure, the second front end module 213 may support the transmission or the reception of the signals of at least a part of the frequency band of the first communication and of at least a part of the frequency band of the second communication. In an embodiment, the second front end module 213 may be connected to the first communication circuit 211 controlling the transmission or reception of the signal through the first communication and the second communication circuit 221 controlling the transmission or reception of the signal through the second communication. In an embodiment, the second front end module 213 may process (e.g., amplify or remove noise from) the signal of the frequency band of the first communication, being received by the first antenna 241, and may transmit the processed signal to the first communication circuit 211. The second front end module 213 may process (e.g., amplify or remove noise from) the signal of the frequency band of the second communication, being received by the first antenna 241, and may transmit the processed signal to the second communication circuit 221. In an embodiment, the second front end module 213 may process (e.g., amplify) the signal transmitted by the first communication circuit 211, and may transmit the processed signal to the first antenna 241. The second front end module 231 may process (e.g., amplify) the signal being transmitted by the second communication circuit 221, and may transmit the processed signal to the first antenna 241.

As described above, since the first communication circuit 211 and the second communication circuit 221 use the same front end module (e.g., the second front end module 213), the disposition space of the front end module can be reduced.

According to various embodiments of the disclosure, the first communication circuit 211 may control the second front end module 213 based on the signal being transmitted by the second communication circuit 221. According to an embodiment, the second communication circuit 221 may determine to transmit the signal through the second communication, and may transmit a request signal for requesting transmission of the transmission signal through the second communication to the first communication circuit 211. The first communication circuit 211 may control the second front end module 213 so that the second front end module 213 transmits the transmission signal through the second communication to the first antenna 241 in response to the reception of the request signal from the second communication circuit 221. According to an embodiment, the second communication circuit 221 may determine to receive the signal through the second communication, and may transmit the signal for requesting the reception of the signal through the second communication to the first communication circuit 211. The first communication circuit 211 may control the second front end module 213 so that the second front end module 213 receives the transmission signal through the second communication in response to the reception of the request signal from the second communication circuit 221.

Figure 3:
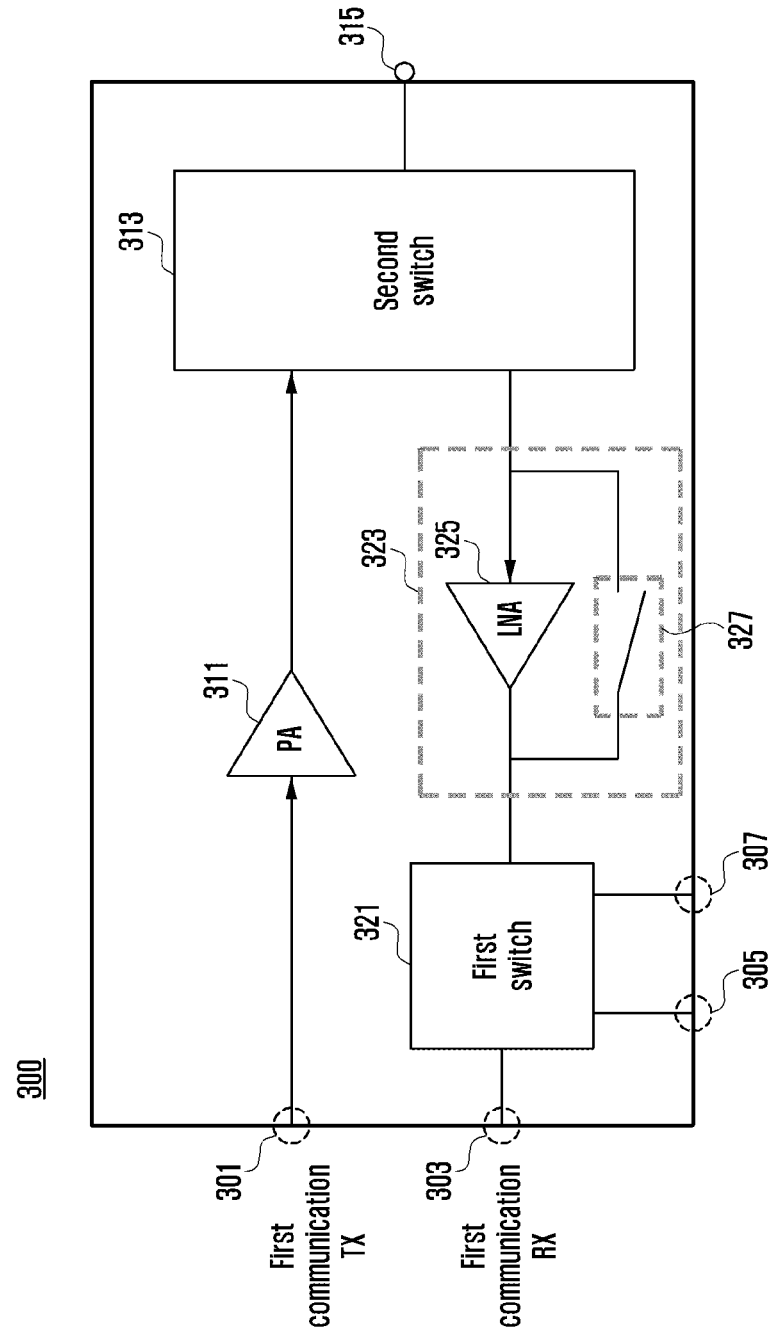
FIG. 3 is a block diagram illustrating an example configuration of a front end module implemented in a communication circuit of an electronic device according to various embodiments.

FIG. 3 is a block diagram illustrating an example configuration of a front end module implemented in an electronic device according to various embodiments.

With reference to FIG. 3, a front end module 300 (e.g., the second front end module 213 or the fourth front end module 215 of FIG. 2A) according to various embodiments of the disclosure may include a first terminal 301 connected to a transmission port of a first communication included in a first communication circuit (e.g., the first communication circuit 211 of FIG. 2A) and configured to receive a transmission signal of the first communication, a second terminal 303 connected to a reception port of the first communication included in the first communication circuit 211 and configured to transmit a reception signal of the first communication to a reception port of the first communication, a third terminal 305 connected to a reception port of a second communication included in a second communication circuit (e.g., the second communication circuit 221 of FIG. 2A) or a transmission port of the second communication included in the second communication circuit 221 and configured to receive a transmission signal of the second communication or to output a reception signal of the second communication, and/or a fourth terminal 307 connected to the reception port of the second communication or the transmission port of the second communication and configured to receive the transmission signal of the second communication or to output the reception signal of the second communication. The front end module 300 may be connected to the first communication circuit (e.g., the first communication circuit 211 of FIG. 2A) through the first terminal 301, and configured to receive a signal being transmitted by the first communication circuit 211 and to transmit the received signal to a first amplifier 311. The first amplifier 311 may amplify the received signal, and may transmit the amplified signal to an antenna (e.g., the first antenna 241 or the second antenna 242 of FIG. 2).

According to various embodiments of the disclosure, the front end module 300 may include a first switch 321 configured to connect an amplifier circuit 323 to one of the second terminal 303, the third terminal 305, and the fourth terminal 307. For example, the first switch may include a switch including a plurality of output throws connected to at least one of the second terminal 303, the third terminal 305, and the fourth terminal 307 and one pole connected to the amplifier circuit 323. The first switch 321 of FIG. 3 may be implemented by single pole three throws (SP3T).

According to various embodiments of the disclosure, the front end module 300 may include an amplifier circuit 325. The amplifier circuit 325 may include a second amplifier 325 configured to amplify the signal (e.g., reception signal of the frequency band of the first communication or reception signal of the frequency band of the second communication) received from the antenna (e.g., first antenna 241 or second antenna 242 of FIG. 2), and a bypass path 327 that is a path for transmitting the signal without passing through the second amplifier 325. For example, in order for the signal not to pass through the second amplifier 325, the bypass path 327 may be connected in parallel to the second amplifier 325. As another example, the bypass path 327 may be used as a path for transmitting the signal received from the antenna to the first switch 321. According to an embodiment, the bypass path 327 may be used as a path for transmitting the signal (e.g., transmission signal of the second communication) transmitted by the second communication circuit 221 to the second switch 313 and the antenna. According to an embodiment, the bypass path 327 may include a switch. For example, the first communication circuit 211 or the second communication circuit 221 may activate the bypass path 327 by controlling the bypass path 327 so that the switch is switched to (or maintains) a closed state, and the signal transmitted by the second communication circuit 221 may be transmitted to the antenna through the bypass path 327. As still another example, the first communication circuit 211 or the second communication circuit 221 may deactivate the bypass path 327 by controlling the bypass path 327 so that the switch is switched to (or maintains) an open state, and the signal received by the antenna (e.g., the reception signal of the first communication or the reception signal of the second communication) may be transmitted to the first communication circuit 211 or the second communication circuit 221 through the amplifier 325. The second amplifier 325 may be deactivated in a state that the bypass path 327 is activated.

According to an embodiment, the second amplifier 325 may include a low-noise amplifier.

According to various embodiments of the disclosure, the front end module 300 may include a second switch 313 configured to connect an antenna port 315 to one of the amplifier circuit 323 or the first terminal 301 (or the first amplifier 311). The second switch 313 may include a switch including two output throws connected to at least one of the transmission port of the first communication or the first switch and one pole connected to the antenna port 315. The second switch of FIG. 3 may include a single pole double throws (SPDT) type switch. In an embodiment, the antenna port 315 may be connected to the antenna (e.g., the first antenna 241 or the second antenna 242).

According to various embodiments of the disclosure, the second communication circuit 221 may determine to transmit the signal through the second communication, and may transmit a request signal for requesting transmission of the transmission signal through the second communication to the first communication circuit 211. In response to the reception of the request signal from the second communication circuit 221, the first communication circuit 211 may control the front end module 300 so that the front end module 300 transmits the transmission signal through the second communication to the first antenna 241 or the second antenna 242.

According to various embodiments of the disclosure, in response to the reception of the request signal, the first processor 211 may control the first switch to connect the amplifier circuit 325 to any one of the third terminal 305 or the fourth terminal 307 so as to receive the transmission signal of the second communication. In an embodiment, the first communication circuit 211 may control the amplifier circuit 323 to activate the bypass path 327 implemented in parallel to the second amplifier 325. The first processor 211 may control the second switch 313 to connect the second amplifier 325 and the antenna port 315 to each other. For example, the transmission signal of the second communication may be output to the antenna via the first switch 321, the bypass path 327, and/or the second switch 313. The front end module 300 is designed to transmit the transmission signal of the second communication through the bypass path 327, and thus may be implemented to be commonly used by the first communication circuit 211 and the second communication circuit 221. The second amplifier 325 may be deactivated in a state that the bypass path 327 is activated.

According to various embodiments of the disclosure, the second communication circuit 221 may determine to receive the signal through the second communication, and may transmit a signal for requesting reception of the signal through the second communication to the first communication circuit 211. In response to the reception of the request signal from the second communication circuit 221, the first communication circuit 211 may control the front end module 300 so that the front end module 300 receives the reception signal through the second communication.

According to various embodiments of the disclosure, in response to the reception of the request signal, the first communication circuit 211 may control the first switch to connect the amplifier circuit 323 to any one of the third terminal 305 or the fourth terminal 307 so as to receive the reception signal of the second communication. In an embodiment, the first communication circuit 211 may control the amplifier circuit 323 to deactivate the bypass path 327 implemented in parallel to the second amplifier 325. The first communication circuit 211 may control the second switch 313 to connect the amplifier circuit 323 and the antenna port 315 to each other. For example, the reception signal of the second communication may be transmitted to the second communication circuit 221 via the second switch 313, the second amplifier 325, and/or the first switch 321. The front end module 300 is designed to transmit the reception signal of the second communication to the second communication circuit 221 through the amplifier circuit 323, and thus may be implemented to be commonly used by the first communication circuit 211 and the second communication circuit 221.

According to various embodiments of the disclosure, the first communication circuit 211 may determine to receive the signal through the first communication, and may control the front end module 300 so that the front end module 300 receives the reception signal through the first communication.

According to various embodiments of the disclosure, the first communication circuit 211 may control the first switch to connect the second terminal 303 and the amplifier circuit 323 to each other so as to receive the reception signal of the first communication. In an embodiment, the first processor 211 may control the amplifier circuit 323 to deactivate the bypass path 327 implemented in parallel to the second amplifier 325. The first processor 211 may control the second switch 313 to connect the amplifier circuit 323 and the antenna port 315 to each other. For example, the reception signal of the first communication may be transmitted to the first processor 211 via the second switch 313, the second amplifier 325, and/or the first switch 321. The front end module 300 is designed to transmit the reception signal of the first communication to the first processor 211 through the amplifier circuit 323, and thus may be implemented to be commonly used by the first communication circuit 211 and the second communication circuit 221.

According to various embodiments of the disclosure, the first communication circuit 211 may determine to transmit the signal through the first communication, and may control the front end module 300 so that the front end module 300 transmits the transmission signal through the first communication.

According to various embodiments of the disclosure, the first communication circuit 211 may control the second switch 313 to connect the first terminal 301 (or the first amplifier 311) and the antenna port 315 to each other so as to transmit the transmission signal of the first communication. For example, the transmission signal of the first communication may be transmitted to the antenna via the first amplifier 311 and the second switch 313.

According to various embodiments of the disclosure, the second communication circuit 221 may not directly control the front end module (e.g., the first front end module 212, the second front end module 213, the third front end module 214, and/or the fourth front end module 215 of FIG. 2). For example, the second communication circuit 221 may transmit the signal for requesting the control of the front end module to the first communication circuit 211, and the first communication circuit 211 may perform the control of the front end module. For example, since a control signal may not be transmitted between the second communication circuit 221 and the front end module, a separate line for transmitting the control signal of the front end module may not be required, and thus a circuit disposition space can be reduced.

Figure 4:
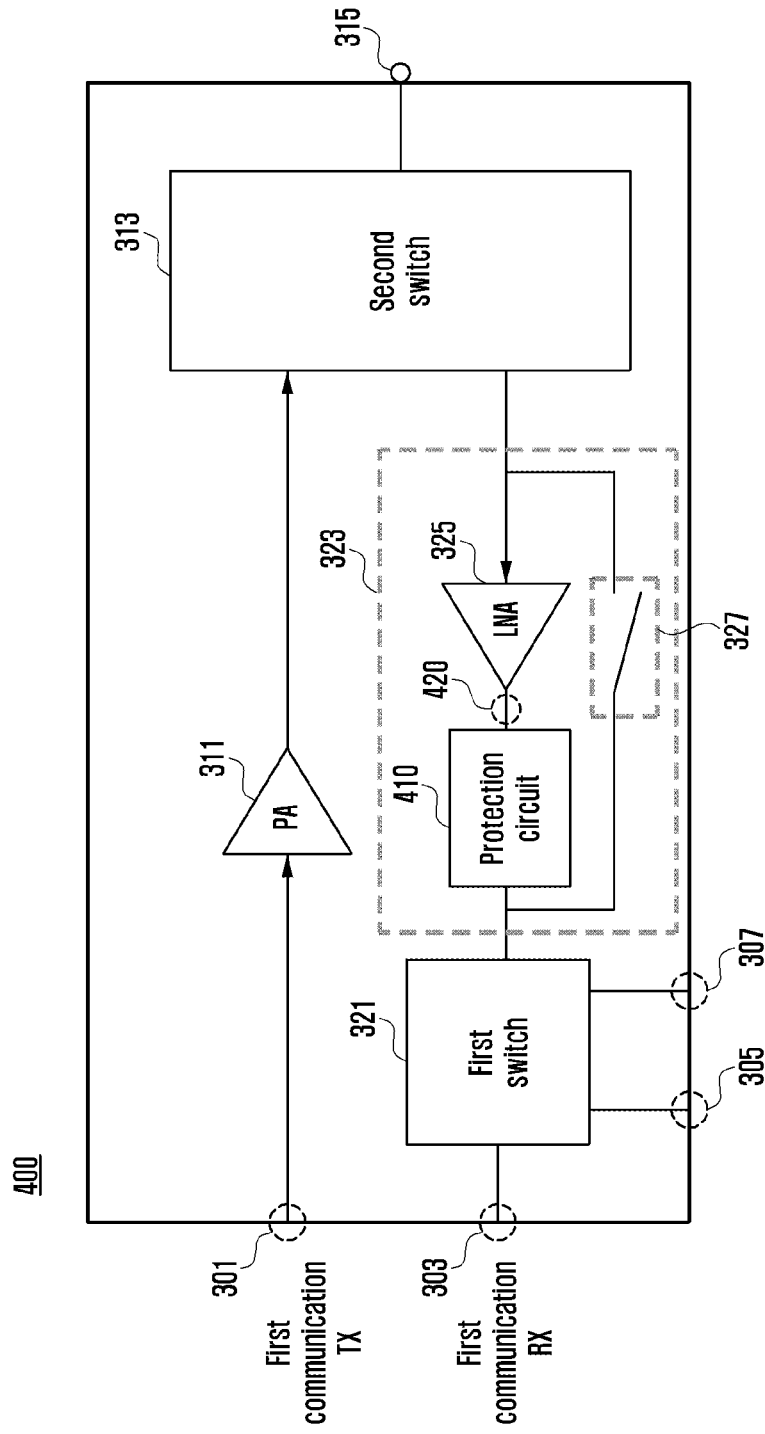
FIG. 4 is a block diagram illustrating an example configuration of a front end module implemented in a communication circuit of an electronic device according to various embodiments.

FIG. 4 is a block diagram illustrating an example configuration of a front end module implemented in a communication circuit of an electronic device according to various embodiments.

A front end module 400 illustrated in FIG. 4 may be provided by adding a protection circuit 410 to the front end module 300 illustrated in FIG. 3.

According to various embodiments of the disclosure, a path for transmitting the transmission signal of the second communication (e.g., a transmission path through the first switch 321, the bypass path 327, and the second switch 315) may be different from a path for transmitting the reception signal of the first communication and the reception signal of the second communication (e.g., transmission path through the second switch 315, the second amplifier 325, and the first switch 321). In an embodiment, the transmission signal of the second communication may be transmitted to the bypass path 327 and the second amplifier 325. For example, if a situation occurs, in which the transmission signal of the second communication is input to an output terminal 420 of the second amplifier 325, the second amplifier 325 may be damaged. For example, if the second communication is the ultra-wideband communication, the strength of the transmission signal of the second communication is relatively high, and thus the second amplifier 325 may be damaged.

According to various embodiments of the disclosure, the front end module 400 (e.g., the second front end module 213 or the fourth front end module 215 of FIG. 2A) may further include the protection circuit 410 connected between an output terminal 420 of the second amplifier 325 and the first switch 321. In an embodiment, the protection circuit 410 may include a passive element or an active element. For example, the protection circuit 410 may prevent/block the transmission signal of the second communication from being input to the second amplifier 325, or may reduce an input of the transmission signal of the second communication to the second amplifier 325. For example, the protection circuit 410 may reduce the damage of the second amplifier 325 caused by the transmission signal of the second communication.

Figure 5:
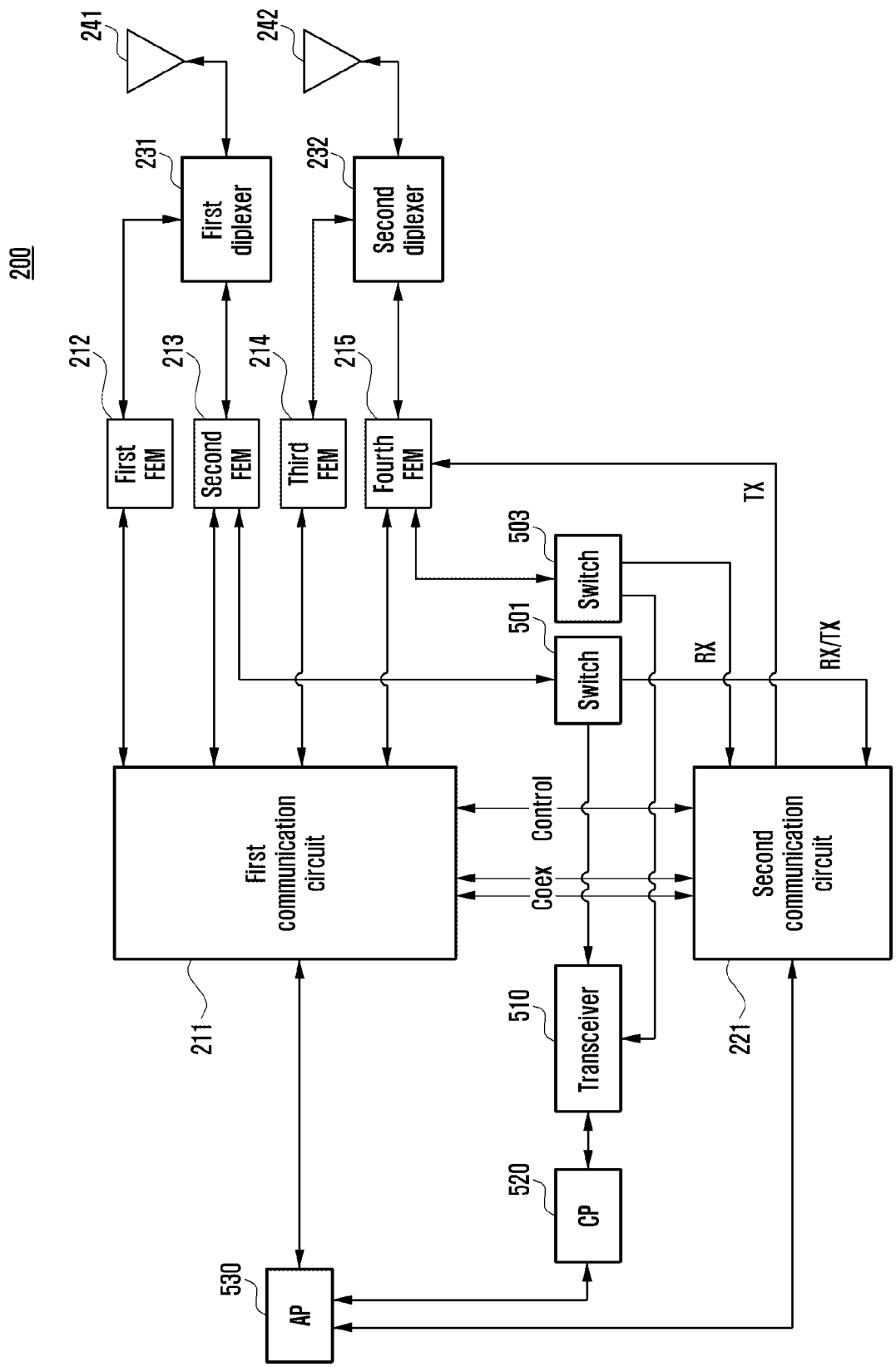
FIG. 5 is a block diagram illustrating an example configuration of a communication circuit of an electronic device according to various embodiments.

FIG. 5 is a block diagram illustrating an example configuration of a communication circuit of an electronic device according to various embodiments.

The electronic device 101 according to various embodiments of the disclosure may support the reception of a signal through a third communication having a frequency band partially overlapping the frequency band (e.g., 5.150 GHz to 7.125 GHz) of the first communication and the frequency band (e.g., 6.24 GHz to 8.2368 GHz) of the second communication. According to an embodiment, the third communication is of a license assisted access (LAA) communication type, and may be a communication having a frequency band of 5.15 GHz to 5.925 GHz. The electronic device 101 may receive the reception signal of the third communication through the first antenna 241 or the second antenna 242.

According to various embodiments of the disclosure, the electronic device 101 may include a communication processor (e.g., including processing circuitry) 520 (e.g., communication module 190 of FIG. 1) performing an operation related to the first communication, the second communication, or the third communication, and/or an application processor (e.g., including processing circuitry) 530 (e.g., processor 120 of FIG. 1) processing data using the first communication, the second communication, or the third communication. In an embodiment, the communication processor 520 and the application processor 530 may be formed as one chip.

According to various embodiments of the disclosure, the communication processor 520 may be connected to a transceiver 510, and may control the transceiver 510.

According to various embodiments of the disclosure, some elements may be added or modified with respect to the electronic device 101 in order to support the reception of the signals through the front end module (e.g., the second front end module 213 or the fourth front end module 215 of FIG. 2, the front end module 300 of FIG. 3, or the front end module 400 of FIG. 4), or the third communication.

According to various embodiments of the disclosure, the second front end module 213 may transmit the reception signal of the third communication, being received through the first antenna 241, to the transceiver 510 through the third switch 501. The fourth front end module 215 may transmit the reception signal of the third communication, being received through the second antenna 243, to the transceiver 510 through the fourth switch 503.

According to various embodiments of the disclosure, the first switch (e.g., the first switch 321 of FIG. 3) implemented in the front end module (e.g., the second front end module 213 or the fourth front end module 215 of FIG. 2A, the front end module 300 of FIG. 3, or the front end module 400 of FIG. 4) may transmit the reception signal of the third communication to the third terminal (e.g., the third terminal 305 of FIG. 3) or the fourth terminal (e.g., the fourth terminal 307 of FIG. 3).

According to an embodiment, in case that the reception signal of the third communication is transmitted to the third terminal 305 of the fourth front end module 215, the reception signal of the second communication may be transmitted to the third terminal 305 of the second front end module 213. In an embodiment, the transmission signal or the reception signal of the second communication may be transmitted through the same terminal (e.g., the fourth terminal 307). For example, in case that the second front end module 213 is configured so that the transmission signal or the reception signal of the second communication is transmitted through the same terminal (e.g., the fourth terminal 307), the reception signal of the third communication may be configured to be transmitted through another terminal (e.g., the third terminal 305).

According to various embodiments of the disclosure, the transmission signal of the second communication and the reception signal of the second communication may be transmitted through different terminals. According to an embodiment, the reception signal of the second communication and the reception signal of the third communication may be transmitted through the same terminal (e.g., the third terminal 305), and the transmission signal of the second communication may be output through another terminal (e.g., the fourth terminal 307).

According to various embodiments of the disclosure, in case that the reception signal of the second communication or the reception signal of the third communication is transmitted through the same terminal (e.g., the third terminal 305), the electronic device 101 may further include a third switch 501 or a fourth switch 503 changing the transmission path of the reception signal of the second communication and the reception signal of the third communication. In an embodiment, the third switch 501 or the fourth switch 503 may connect one of the reception port of the second communication (or the second processor 221) or the reception port of the third communication (or the transceiver 510 processing the reception signal of the third communication) to the first switch 321 (or the second front end module 213 or the fourth front end module 215). In an embodiment, the third switch 501 or the fourth switch 503 may be controlled by the transceiver 510 processing the reception signal of the third communication, the first communication circuit 211, the second communication circuit 221, or the communication processor 520.

According to various embodiments of the disclosure, in response to the reception of the signal for requesting the reception of the third communication from the communication processor 520, the first communication circuit 211, the second communication circuit 221, or the transceiver 510 may control the third switch 501 or the fourth switch 503 to connect the reception port of the third communication and the first switch 321 to each other. For example, the reception signal of the third communication may be transferred to the transceiver 510 through the first antenna 241, the second front end module 213, and the third switch 501. As another example, the reception signal of the third communication may also be transferred to the transceiver 510 through the second antenna 242, the fourth front end module 215, and the fourth switch 503. The transceiver 510 may process the received reception signal of the third communication, and may transmit the processed reception signal to the communication processor 520. The communication processor 520 may transmit data included in the reception signal of the third communication to the application processor 530.

According to various embodiments of the disclosure, the first communication circuit 211 or the second communication circuit 221 may control the third switch 501 or the fourth switch 503 to receive the reception signal of the second communication. For example, the reception signal of the second communication may be transferred to the second communication circuit 221 through the first antenna 241, the second front end module 213, and the third switch 501. As another example, the reception signal of the third communication may also be transferred to the second communication circuit 221 through the second antenna 242, the fourth front end module 215, and the fourth switch 503. The second communication circuit 221 may process the received reception signal of the second communication, and may transmit the processed reception signal to the communication processor 520. The communication processor 520 may transmit data included in the reception signal of the second communication to the application processor 530.

Figure 6:
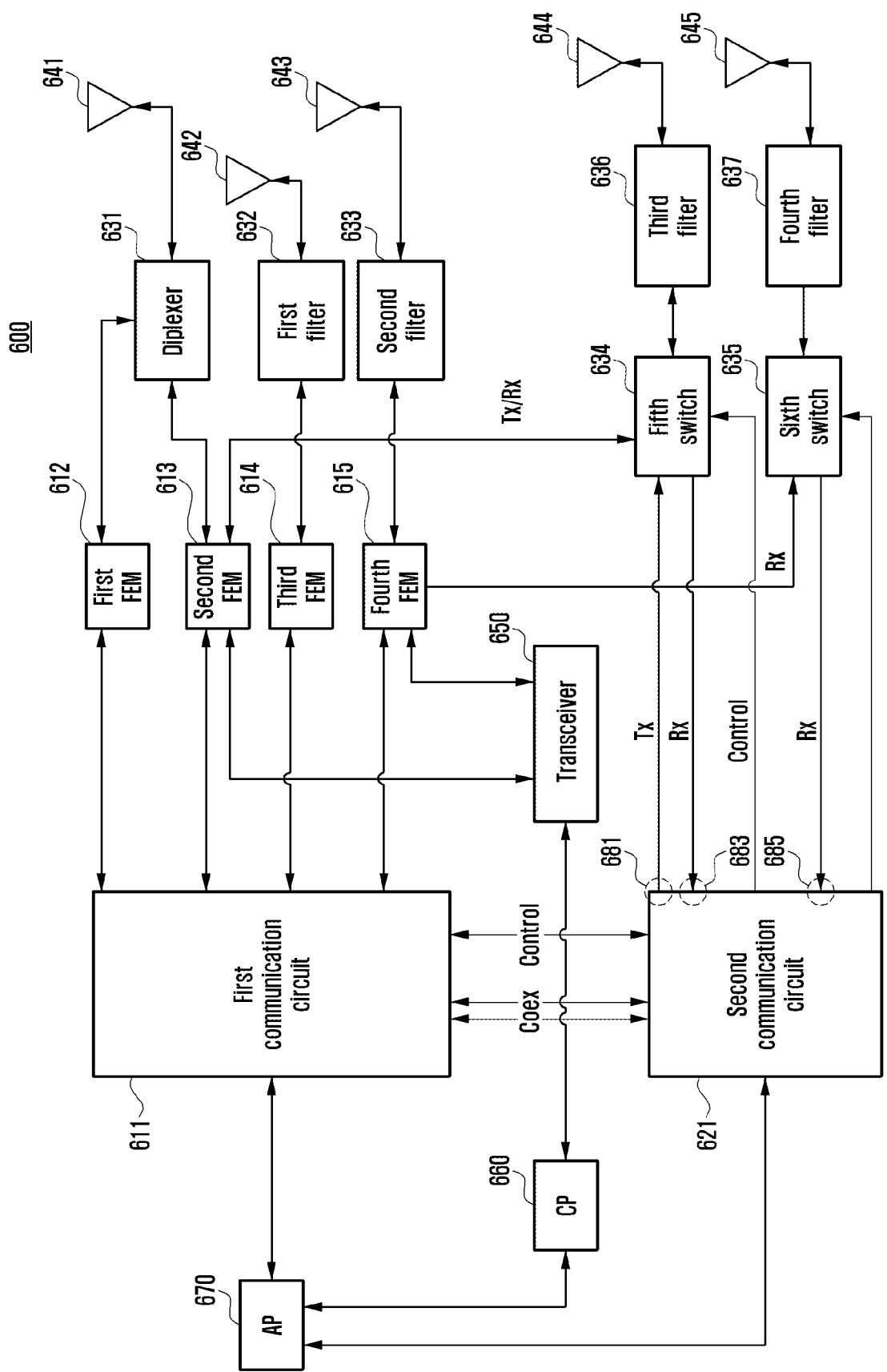
FIG. 6 is a block diagram illustrating an example configuration of a communication circuit of an electronic device according to various embodiments.

FIG. 6 is a block diagram illustrating an example configuration of a communication circuit of an electronic device according to various embodiments.

With reference to FIG. 6, the electronic device (e.g., electronic device 101 of FIG. 1) according to various embodiments of the disclosure may further include antennas and related components being used to transmit or receive the signal through the second communication as compared with that of FIG. 2A.

According to various embodiments of the disclosure, the electronic device 101 may include a first communication circuit 611 (e.g., the first communication circuit 211 of FIG. 2A), a second communication circuit 621 (e.g., the second communication circuit 221 of FIG. 2A), a diplexer 631 (e.g., the first diplexer 231 of FIG. 2A), a fifth switch 634, a sixth switch 635, a first filter 632, a second filter 633, a third filter 636, a fourth filter 637, a first antenna 641 (e.g., the first antenna 241 of FIG. 2), a second antenna 642, a third antenna 643, a fourth antenna 644, a fifth antenna 645, a transceiver 650, a communication processor (e.g., including processing circuitry) 660 (e.g., the communication module 190 of FIG. 1 or the communication processor 520 of FIG. 5), and/or an application processor (e.g., including processing circuitry) 670 (e.g., the processor 120 of FIG. 1 or the application processor 530 of FIG. 5).

According to various embodiments of the disclosure, the electronic device 101 may include various components (e.g., front end module, amplifier, switch, or splitter) for performing reception of the signal through the first communication or transmission of the signal through the first communication. The first communication may refer to one of various wireless communications supported by the electronic device 101. For example, the first communication may be a Wi-Fi communication supported by the electronic device 101. The electronic device 101 may include the first communication circuit 611 controlling the transmission or the reception of the signal through the first communication. The first communication circuit 611 may be connected to the communication processor 660, and may operate based on the control of the communication processor 660.

According to various embodiments of the disclosure, the electronic device 101 may include various components (e.g., amplifier, switch, or splitter) for performing reception of the signal through the second communication or transmission of the signal through the second communication. The second communication may be one of various wireless communications supported by the electronic device 101, and may refer to a different communication from the first communication. For example, the second communication may be an ultra-wideband communication (UWB) supported by the electronic device 101. The electronic device 101 may include the second communication module 621 controlling the transmission or the reception of the signal through the second communication. The second communication module 621 may include at least one transmission port of the second communication outputting the transmission signal of the second communication and at least one reception port of the second communication receiving the reception signal of the second communication. The second communication circuit 621 may be connected to the communication processor 660, and may operate based on the control of the communication processor 660.

According to various embodiments of the disclosure, the transceiver 650 may include various components (e.g., amplifier, switch, or splitter) for performing the reception of the signal through the third communication. The third communication may be one of various wireless communications supported by the electronic device 101, and may refer to a different communication from the first communication and the second communication. For example, the third communication may be a licensed assist access (LAA) supported by the electronic device 101.

According to various embodiments of the disclosure, the frequency band of the first communication, the frequency band of the second communication, and the frequency band of the third communication may overlap one another at least partially. For example, in case that the first communication is the communication supporting IEEE 802.11 ax (or Wi-Fi 6), the frequency band of the first communication may be 5.15 GHz to 7.125 GHz. For example, in case that the second communication is the UWB, the frequency band of the second communication may be 6.24 GHz to 8.24 GHz. In case that the third communication is the LAA, the frequency band of the third communication may be 5.15 GHz to 5.925 GHz. The frequency band of the first communication and the frequency band of the second communication may overlap each other within the frequency of 6.24 GHz to 7.125 GHz, and the frequency band of the first communication and the frequency band of the third communication may overlap each other within the frequency of 5.15 GHz to 5.925 GHz.

According to various embodiments of the disclosure, the electronic device 101 may include the first communication circuit 611, a first front end module (FEM) 612 (e.g., the first front end module 212 of FIG. 2A), a second front end module 613 (e.g., the second front end module 213 of FIG. 2A, the front end module 300 of FIG. 3, or the front end module 300 of FIG. 4), a third front end module 614 (e.g., the third front end module 214 of FIG. 2A), and/or a fourth front end module 615 (e.g., the fourth front end module 215 of FIG. 2A, the front end module 300 of FIG. 3, or the front end module 300 of FIG. 4).

According to various embodiments of the disclosure, the first communication circuit 611 may control the transmission or the reception of the signal through the first communication.

According to various embodiments of the disclosure, the first front end module 612 may amplify the signal received through the first antenna 641, or may transmit the reception signal of the first communication, from which noise has been removed, to the first communication circuit 611. The first front end module 612 may amplify the transmission signal of the first communication, having been transmitted by the first communication circuit 611, or may remove the noise. The processed signal may be output through the first antenna 641 via the diplexer 631. The frequency band of the signal being received or output by the first front end module 612 may be defined as a first frequency band. For example, the first frequency band may be a partial frequency band (e.g., 2.4 GHz to 2.5 GHz) of the frequency band of the first communication.

According to various embodiments of the disclosure, the second front end module 613 may amplify the signal received through the first antenna 641, or may transmit the reception signal of the first communication, from which the noise has been removed, to the first communication circuit 611. The second front end module 613 may amplify the transmission signal of the first communication, having been transmitted by the first communication circuit 611, or may remove the noise. The processed signal may be output through the first antenna 641 via the diplexer 631. The frequency band of the signal being received or output by the second front end module 613 may be defined as a second frequency band. For example, the second frequency band may be a frequency band (e.g., 5.15 GHz to 7.25 GHz) including a partial frequency band (e.g., 5.15 GHz to 7.125 GHz) of the frequency band of the first communication, a partial frequency band (6.24 GHz to 7.25 GHz) of the frequency band of the second communication, and/or a frequency band (e.g., 5.15 GHz to 5.925 GHz) of the third communication.

According to various embodiments of the disclosure, the first antenna 641 may receive a signal being transmitted by an external electronic device. For example, the first antenna 641 may receive or output the signal of the first frequency band (e.g., 2.4 GHz to 2.5 GHz) and/or the signal of the second frequency band (e.g., 5.15 GHz to 7.25 GHz). The diplexer 631 may filter the signal received by the first antenna 641 according to the frequency band. According to an embodiment, the diplexer 631 may transmit the signal of the first frequency band among the received signals to the first front end module 612. According to an embodiment, the diplexer 631 may transmit the signal of the second frequency band among the received signals to the second front end module 613.

According to various embodiments of the disclosure, the second front end module 613 may support transmission or reception of the signals of at least a part of the frequency band of the first communication and of at least a part of the frequency band of the second communication. The second front end module 613 may support the reception of the signal of the frequency band of the third communication. In an embodiment, the second front end module 613 may be connected to the first processor 611 controlling the transmission or reception of the signal through the first communication, the second processor 621 controlling the transmission or reception of the signal through the second communication, or the transceiver 650 controlling the reception of the signal through the third communication. In an embodiment, the second front end module 613 may process (e.g., amplify or remove noise from) the signal of the frequency band of the first communication, being received by the first antenna 641, and may transmit the processed reception signal of the first communication to the first processor 611. The second front end module 613 may process (e.g., amplify or remove noise from) the signal of the frequency band of the second communication, being received by the first antenna 641, and may transmit the processed reception signal of the second communication to the second communication module 620 through the fifth switch 634. The second front end module 613 may process (e.g., amplify or remove noise from) the signal of the frequency band of the third communication, being received by the first antenna 641, and may transmit the processed reception signal of the third communication to the transceiver 650.

In an embodiment, the second front end module 613 may process (e.g., amplify or remove noise from) the transmission signal of the first communication, being transmitted by the first processor 611, and may transmit the processed signal to the first antenna 641. The second front end module 631 may process (e.g., amplify or remove noise from) the transmission signal of the second communication, being transmitted by the second processor 621, and may transmit the processed signal to the first antenna 641.

According to an embodiment, the above-described operation may be implemented as the first processor 611 controls the second front end module 613. For example, the first communication circuit 611 may receive, from the transceiver 650, a signal for requesting the transmission or the reception of the signal through the first communication from the communication processor 660, a signal for requesting the transmission or the reception of the signal through the second communication from the second communication circuit 622, or a signal for requesting the reception of the signal through the third communication, and may perform the transmission or the reception of the signal through the first communication, the transmission or the reception of the signal through the second communication, or the reception of the signal through the third communication by controlling the first switch (e.g., the first switch 305 of FIG. 3) implemented in the second front end module 613, the amplifier circuit (e.g., the amplifier circuit 325 of FIG. 3), and/or the second switch (e.g., the second switch 313 of FIG. 3).

According to various embodiments of the disclosure, the third front end module 614 may amplify the signal received through the second antenna 642, or may transmit the received signal, from which the noise has been removed, to the first communication circuit 611. The third front end module 614 may amplify the signal transmitted by the first communication circuit 611, or may remove the noise. The processed signal may be output through the second antenna 642 through the first filter 632. In an embodiment, the second antenna 642 may be an antenna receiving or outputting the signal corresponding to the first frequency band. For example, the first filter 632 may be a filter reducing or removing the signal of the remaining frequency band excluding a partial frequency band (e.g., 2.4 GHz to 2.5 GHz) from the signal transmitted by the third front end module 614 or the signal transmitted by the second antenna 642. In an embodiment, the frequency band of the signal being received or output by the third front end module 614 may be substantially the same as the first frequency band that is the frequency band of the signal being received or output by the first front end module 212.

According to various embodiments of the disclosure, the fourth front end module 615 may support the transmission or the reception of the signals of at least a part of the frequency band of the first communication, at least a part of the frequency band of the second communication, and the frequency band of the third communication. In an embodiment, the fourth front end module 615 may be connected to the first communication circuit 611 controlling the transmission or the reception of the signal through the first communication, the second communication circuit 621 controlling the transmission or the reception of the signal through the second communication, and the transceiver 650 controlling the reception of the signal through the third communication. In an embodiment, the fourth front end module 615 may process (e.g., amplify or remove noise from) the signal of the partial frequency band (e.g., 5.15 GHz to 7.25 GHz) of the first communication, being received by the third antenna 643, and may transmit the processed reception signal of the first communication to the first communication circuit 611. The fourth front end module 615 may process (e.g., amplify or remove noise from) the signal of the partial frequency band (e.g., 6.24 GHz to 7.25 GHz) of the second communication, being received by the third antenna 643, and may transmit the processed reception signal of the second communication to the second communication module 620 (or the second processor 621) through the sixth switch 635. The fourth front end module 615 may process (e.g., amplify or remove noise from) the signal of the partial frequency band (e.g., 6.24 GHz to 7.25 GHz) of the frequency band of the third communication, being received by the third antenna 643, and may transmit the processed reception signal of the third communication to the transceiver 650.

In an embodiment, the fourth front end module 615 may process (e.g., amplify or remove noise from) the transmission signal of the first communication, being transmitted by the first processor 611, and may transmit the processed signal to the third antenna 643. The fourth front end module 615 may process (e.g., amplify or remove noise from) the transmission signal of the second communication, being transmitted by the second communication circuit 621, and may transmit the processed signal to the third antenna 643.

According to various embodiments of the disclosure, the third antenna 643 may receive or output the signals of the partial frequency band (e.g., 5.15 GHz to 7.25 GHz) of the first communication, the partial frequency band (e.g., 6.24 GHz to 7.25 GHz) of the second communication, and the partial frequency band (e.g., 5.15 GHz to 5.925 GHz) of the third communication. In an embodiment, the second filter 633 may be disposed between the third antenna 643 and the fourth front end module 633. For example, the second filter 633 may be a filter reducing or removing the signal of the remaining frequency band excluding the partial frequency band (e.g., 5.15 GHz to 7.25 GHz) from the signal transmitted by the fourth front end module 615 or the signal transmitted by the third antenna 643.

According to an embodiment, the above-described operation may be implemented as the first communication circuit 611 controls the fourth front end module 615. For example, the first communication circuit 611 may receive, from the transceiver 650, the signal for requesting the transmission or the reception of the signal through the second communication from the second communication circuit 622, or the signal for requesting the reception of the signal through the third communication, and may perform the transmission or the reception of the signal through the first communication, the transmission or the reception of the signal through the second communication, or the reception of the signal through the third communication by controlling the first switch (e.g., the first switch 305 of FIG. 3) implemented in the fourth front end module 615, the amplifier circuit (e.g., the amplifier circuit 325 of FIG. 3), and/or the second switch (e.g., the second switch 313 of FIG. 3).

According to various embodiments of the disclosure, the electronic device 101 may further include separate antennas (e.g., the fourth antenna 644 and the fifth antenna 645) for transmitting or receiving the signal corresponding to the partial frequency band (e.g., 7.25 GHz to 8.25 GHz) of the second communication and separate elements (e.g., the fifth switch 634 and the sixth switch 635).

According to various embodiments of the disclosure, the fifth switch 634 may connect one of a reception port 683 of the second communication included in the second communication circuit 621 and a transmission port 681 of the second communication included in the second communication circuit 621 to one of the third filter 636 and the second front end module 613. The fifth switch 634 may be implemented by a switch including a plurality of output throws connected to at least one of the reception port and the transmission port, and a plurality of poles connected to at least one of the port connected to the second front end module 613 and/or the port connected to the third filter 636. For example, the fifth switch 634 of FIG. 6 may include a double pole double throw (DPDT). In an embodiment, the second communication circuit 621 may control the fifth switch 634 in consideration of the frequency band of the reception signal of the second communication or the frequency band of the transmission signal of the second communication.

According to various embodiments of the disclosure, the second communication circuit 621 may control the fifth switch 634 so as to connect the transmission port 681 of the second communication and the second front end module 613 to each other in response to that the frequency band of the transmission signal of the second communication is identified as the frequency band (e.g., 6.24 GHz to 7.25 GHz) supportable by the second front end module 613.

According to an embodiment, the second communication circuit 621 may transmit the request signal for requesting the transmission of the transmission signal through the second communication to the first communication circuit 611. The second communication circuit 621 may control the fifth switch 634 to connect the transmission port 681 of the second communication and the third filter 636 (or the fourth antenna 644) to each other in response to that the frequency band of the transmission signal of the second communication is identified as the frequency band (e.g., 7.25 GHz to 8.25 GHz) that is not supportable by the second front end module 613.

According to various embodiments of the disclosure, the second communication circuit 621 may control to connect the reception port of the second communication and the second front end module 613 to each other in response to that the frequency band of the reception signal of the second communication is identified as the frequency band (e.g., 6.24 GHz to 7.25 GHz) that is supportable by the second front end module 613. According to an embodiment, the second communication circuit 621 may transmit the request signal for requesting the reception of the reception signal through the second communication to the first communication circuit 611. The second communication circuit 621 may control to connect the reception port of the second communication and the third filter 636 (or the fourth antenna 644) to each other in response to that the frequency band of the reception signal of the second communication is identified as the frequency band (e.g., 7.25 GHz to 8.25 GHz) that is not supportable by the first front end module 613.

According to an embodiment, the communication processor 660 may control the first communication circuit 611, the second communication circuit 621, and/or the transceiver 650 based on the priority of the plurality of communications in a situation in which the plurality of communications (e.g., the first communication, the second communication, and/or the third communication) are used at the same time. The first communication circuit 611 may control the first front end module 612, the second front end module 613, the third front end module 614, and/or the fourth front end module 615 in order to support the transmission or the reception of the signal through the communication having the highest priority among the plurality of communications based on the control of the communication processor 660. In an embodiment, if the priority is in the order of the first communication, the second communication, or the third communication, the communication processor 660 may control the first front end module 612, the second front end module 613, the third front end module 614, and/or the fourth front end module 615 based on the priority. For example, in case that the second communication circuit 621 transmits the request signal for requesting the reception of the reception signal through the second communication while the first communication is used using the first communication circuit 611, to the first communication circuit 611 or the communication processor 660, the first communication circuit 611 or the communication processor 660 may disregard the request, and may maintain the usage of the first communication. As another example, in case that the second communication circuit 621 transmits the request signal for requesting the reception of the reception signal through the second communication while the third communication is used using the transceiver 650, to the first communication circuit 611 or the communication processor 660, the first communication circuit 611 or the communication processor 660 may be configured to stop the third communication and to receive the second communication.

According to an embodiment, the communication processor 660 may also control the first communication circuit 611, the second communication circuit 621, and/or the transceiver 650 using a time division method in a situation in which the plurality of communications (e.g., the first communication, the second communication, and/or the third communication) are used at the same time. For example, the communication processor 660 may control the first front end module 612, the second front end module 613, the third front end module 614, and/or the fourth front end module 615 in order to support the transmission or the reception of the signal using the first communication for a specific time. The communication processor 660 may control the first front end module 612, the second front end module 613, the third front end module 614, and/or the fourth front end module 615 in order to support the transmission or the reception of the signal using the second communication for another time. The communication processor 660 may control the first front end module 612, the second front end module 613, the third front end module 614, and/or the fourth front end module 615 in order to support the transmission or the reception of the signal using the third communication for still another time.

According to various embodiments of the disclosure, the third filter 636 may be connected between the fifth switch 634 and the fourth antenna 644. For example, the third filter 636 may be a filter reducing or removing the signal of the remaining frequency band excluding the partial frequency band (e.g., 7.25 GHz to 8.25 GHz) from the signal being transmitted or received by the fourth antenna 644. For example, the fourth antenna 644 may be an antenna that can output or receive the signal of the partial frequency band (e.g., 7.25 GHz to 8.25 GHz) of the frequency band of the second communication. According to an embodiment, an additional front end module may be disposed between the fifth switch 634 and the third filter 636.

According to various embodiments of the disclosure, the sixth switch 635 may connect a reception port 685 of the second communication included in the second processor 621 to one of the fourth filter 637 and/or the fourth front end module 615. The sixth switch 635 may be implemented by a switch including one pole connected to the reception port and a plurality of output throws connected to at least one of the fourth front end module 615 and the fourth filter 637. For example, the sixth switch 635 of FIG. 6 may include a single pole double throw (SPDT). In an embodiment, the second communication circuit 621 may control the sixth switch 635 in consideration of the frequency band of the reception signal of the second communication.

According to various embodiments of the disclosure, the second communication circuit 621 may control the sixth switch 635 so as to connect the reception port of the second communication and the fourth front end module 615 to each other in response to that the frequency band of the reception signal of the second communication is identified as the frequency band (e.g., 6.24 GHz to 7.25 GHz) supportable by the fourth front end module 615. According to an embodiment, the second communication circuit 621 may transmit the request signal for requesting the reception of the reception signal through the second communication to the first communication circuit 611. The second communication circuit 621 may control the sixth switch 635 to connect the reception port of the second communication and the fourth filter 637 (or the fifth antenna 645) to each other in response to that the frequency band of the reception signal of the second communication is identified as the frequency band (e.g., 7.25 GHz to 8.25 GHz) that is not supportable by the fourth front end module 615.

According to various embodiments of the disclosure, the fourth filter 637 may be connected between the sixth switch 635 and the fifth antenna 645. For example, the fourth filter 637 may be a filter reducing or removing the signal of the remaining frequency band excluding the partial frequency band (e.g., 7.25 GHz to 8.25 GHz) from the signal being transmitted or received by the fifth antenna 645. For example, the fifth antenna 645 may be an antenna that can output or receive the signal of the partial frequency band (e.g., 7.25 GHz to 8.25 GHz) of the frequency band of the second communication. According to an embodiment, an additional front end module may be disposed between the sixth switch 635 and the fourth filter 637.

Figure 7:
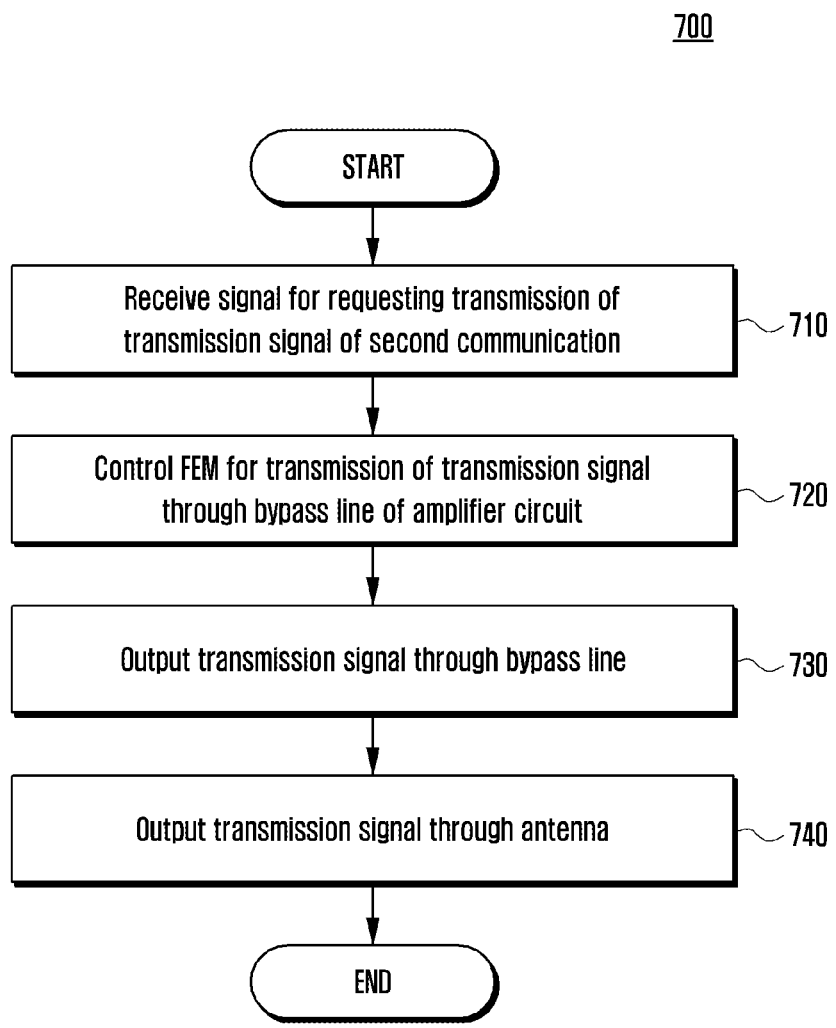
FIG. 7 is a flowchart illustrating an example method for operating an electronic device according to various embodiments.

FIG. 7 is a flowchart illustrating an example method 700 for operating an electronic device according to various embodiments.

According to various embodiments of the disclosure, at operation 710, the first communication circuit (e.g., the first communication circuit 211 of FIG. 2A or the first communication circuit 611 of FIG. 6) included in the electronic device (e.g., electronic device 101 of FIG. 1) may receive the signal for requesting transmission of the transmission signal of the second communication from the second communication circuit (e.g., the second communication circuit 221 of FIG. 2A or the second communication circuit 621 of FIG. 6).

According to various embodiments of the disclosure, at operation 720, the first communication circuit may control the front end module (e.g., the second front end module 213 of FIG. 2, the fourth front end module 215, the front end module 300 of FIG. 3, the front end module 400 of FIG. 4, the second front end module 613 or the fourth front end module 615 of FIG. 6) for the transmission of the transmission signal through the bypass line (e.g., bypass line 327 of FIG. 3) of the amplifier circuit (e.g., the amplifier circuit 323 of FIG. 3).

According to various embodiments of the disclosure, the first communication circuit 211 or 611 may control the first switch (e.g., the first switch 321 of FIG. 3) to connect the amplifier circuit 323 to any one of the third terminal (e.g., the third terminal 305 of FIG. 3) or the fourth terminal (e.g., the fourth terminal 307 of FIG. 3) so as to transmit the transmission signal of the second communication in response to the reception of the request signal. The first communication circuit 211 or 611 may control the amplifier circuit 323 to activate the bypass path 327 implemented in parallel to the second amplifier 325. The first communication circuit 211 or 611 may control the second switch 313 to connect the amplifier circuit 323 and the antenna port 315 to each other. Through the above-described method, the transmission signal of the second communication may be output to the antenna (e.g., the first antenna 241 of FIG. 2 or the second antenna 242 of FIG. 2) via the first switch 321, the bypass path 327, and the second switch 313. Since the front end modules 213, 215, 300, 400, 613, and 615 are designed to transmit the transmission signal of the second communication through the bypass path 327, they may be implemented to commonly use the first communication circuit 211 or 611 and the second communication circuit 221 or 621.

According to various embodiments of the disclosure, at operation 730, the front end modules 213, 215, 300, 613, and 615 may transmit (e.g., output) the transmission signal of the second communication, being transmitted by the second communication circuit 221 or 621 to the antenna 241 or 242 through the bypass path 327.

According to various embodiments of the disclosure, at operation 740, the electronic device 101 may output the transmission signal of the second communication through the antenna 241 or 242.

The front end module (e.g., the second front end module 213 or the fourth front end module 215 of FIG. 2A, the front end module 300 of FIG. 3, the front end module 400 of FIG. 4, the second front end module 613 of FIG. 6, or the fourth front end module 615 of FIG. 6) of the electronic device (e.g., the electronic device 101 of FIG. 1) according to various example embodiments of the disclosure may include: a first terminal (e.g., the first terminal 301 of FIG. 3) connected to a transmission port for the first communication, a second terminal (e.g., the second terminal 303 of FIG. 3) connected to a reception port for the first communication, a first amplifier (e.g., the first amplifier 311 of FIG. 3) connected to the first terminal, the amplifier circuit (e.g., the amplifier circuit 323 of FIG. 3) including a second amplifier (e.g., the second amplifier 325 of FIG. 3) and a bypass line (e.g., the bypass line 327 of FIG. 3) connected in parallel to the second amplifier, a first switch (e.g., the first switch 321 of FIG. 3) connecting the amplifier circuit to one of the second terminal, the third terminal (e.g., the third terminal 305 of FIG. 3) connected to one of the reception port for the second communication or the transmission port for the second communication, or the fourth terminal (e.g., the fourth terminal 307 of FIG. 3) connected to one of the reception port for the second communication or the transmission port for the second communication, and a second switch (e.g., the second switch 313 of FIG. 3) connecting one of the amplifier circuit and the first amplifier to the antenna (e.g., the first antenna 241 of FIG. 2A, the second antenna 242 of FIG. 2A, the first antenna 641 of FIG. 6, or the third antenna 643 of FIG. 6), wherein the transmission signal for the second communication is configured to be transmitted to the antenna through the bypass line connected in parallel to the second amplifier included in the amplifier circuit, and the reception signal for the second communication is configured to be transmitted to the reception port of the second communication through the second amplifier.

In the front end module according to various example embodiments of the disclosure, the amplifier circuit may include a protection circuit (e.g., the protection circuit 410 of FIG. 4) configured to block the transmission signal for the second communication, being input to the second amplifier, and the protection circuit may be connected between the second amplifier and the first switch.

In the front end module according to various example embodiments of the disclosure, the first switch may comprise a switch including a plurality of throws connected to at least one of the second terminal, the third terminal, or the fourth terminal, and one pole connected to the amplifier circuit.

In the front end module according to various example embodiments of the disclosure, the second switch may comprise a switch including two throws connected to at least one of the first terminal or the first switch, and one pole connected to the antenna.

In the front end module according to various example embodiments of the disclosure, the frequency band (e.g., 5.15 GHz to 7.125 GHz) of the first communication may partially (6.24 GHz to 7.125 GHz) overlap the frequency band (e.g., 6.24 GHz to 8.24 GHz) of the second communication.

The front end module according to various example embodiments of the disclosure may be configured to support reception of a third communication having the frequency band (e.g., 5.15 GHz to 5.925 GHz) partially overlapping the frequency band (e.g., 5.15 GHz to 7.125 GHz) of the first communication, and the third terminal or the fourth terminal may be connected to the reception port for the third communication.

In the front end module according to various example embodiments of the disclosure, the third terminal or the fourth terminal may be connected to the third switch (e.g., the third switch 501 of FIG. 5 or the fourth switch 503 of FIG. 5) configured to be selectively connected to one of the reception port for the second communication or the reception port for the third communication.

An electronic device according to various example embodiments of the disclosure may include: a first antenna (e.g., the first antenna 241 of FIG. 2A, the second antenna 242 of FIG. 2A, the first antenna 641 of FIG. 6, or the third antenna 643 of FIG. 6); a first communication circuit (e.g., the first communication circuit 211 of FIG. 2A or the first communication circuit 611 of FIG. 6) including a transmission port for the first communication configured to output the transmission signal of the first communication and a reception port for the first communication configured to receive the reception signal of the first communication; a second communication circuit (e.g., the second communication circuit 221 of FIG. 2A or the second communication circuit 621 of FIG. 6) including a transmission port for the second communication configured to output the transmission signal for the second communication and a reception port for the second communication configured to receive the reception signal of the second communication; and a front end module (e.g., the second front end module 213 of FIG. 2A, the fourth front end module 215 of FIG. 2A, the front end module 300 of FIG. 3, the front end module 400 of FIG. 4, the second front end module 613 of FIG. 6, or the fourth front end module 615 of FIG. 6) electrically connected to the first communication circuit and the first antenna, wherein the front end module, includes: a first terminal (e.g., the first terminal 301 of FIG. 3) connected to the transmission port for the first communication, a second terminal (e.g., the second terminal 303 of FIG. 3) connected to the reception port for the first communication, a first amplifier (e.g., the first amplifier 311 of FIG. 3) connected to the first terminal, the amplifier circuit (e.g., the amplifier circuit 323 of FIG. 3) including a second amplifier (e.g., the second amplifier 325 of FIG. 3) and a bypass line (e.g., the bypass line 327 of FIG. 3) connected in parallel to the second amplifier, a first switch (e.g., the first switch 321 of FIG. 3) connecting the amplifier circuit to one of the second terminal, a third terminal (e.g., the third terminal 305 of FIG. 3) connected to one of the reception port for the second communication or the transmission port for the second communication, or a fourth terminal (e.g., the fourth terminal 307 of FIG. 3) connected to one of the reception port for the second communication or the transmission port for the second communication, and a second switch (e.g., the second switch 313 of FIG. 3) connecting one of the amplifier circuit and the first amplifier to the antenna (e.g., the first antenna 241 of FIG. 2A, the second antenna 242 of FIG. 2A, the first antenna 641 of FIG. 6, or the third antenna 643 of FIG. 6), wherein the front end module is configured to be controlled so that the transmission signal of the second communication is transmitted to the antenna through the bypass line connected in parallel to the second amplifier included in the amplifier circuit, and the reception signal of the second communication is transmitted to the reception port of the second communication through the second amplifier.

In the electronic device according to various example embodiments of the disclosure, the first communication circuit may be configured to receive the request signal for requesting the transmission of the transmission signal of the second communication from the second communication circuit, and may be configured to control the amplifier circuit to activate the bypass line in response to the reception of the request signal.

In the electronic device according to various example embodiments of the disclosure, the first communication circuit may be configured to control the amplifier circuit to deactivate the amplifier as a part of an operation of activating the bypass line.

In the electronic device according to various example embodiments of the disclosure, the first switch may comprise a switch including a plurality of throws connected to at least one of the second terminal, the third terminal, or the fourth terminal, and one pole connected to the amplifier circuit.

In the electronic device according to various example embodiments of the disclosure, the first communication circuit may be configured to control the first switch to connect the amplifier circuit to the terminal connected to the transmission port of the second communication in response to the reception of the request signal.

In the electronic device according to various example embodiments of the disclosure, the frequency band (e.g., 5.15 GHz to 7.125 GHz) of the first communication may partially (6.24 GHz to 7.125 GHz) overlap the frequency band (e.g., 6.24 GHz to 8.24 GHz) of the second communication.

The electronic device according to various example embodiments of the disclosure may be configured to support the reception of the third communication having the frequency band (e.g., 5.15 GHz to 5.925 GHz) partially overlapping the frequency band (e.g., 5.15 GHz to 7.125 GHz) of the first communication, and the third terminal or the fourth terminal may be connected to the reception port of the third communication.

The electronic device according to various example embodiments of the disclosure may further include the third switch (e.g., the third switch 501 of FIG. 5 or the fourth switch 503 of FIG. 5) connecting the first switch to one of the reception port of the second communication or the reception port of the third communication, wherein the first communication circuit may be configured to control the third switch in response to the reception of the reception signal of the second communication.

The electronic device according to various example embodiments of the disclosure may further include: the second antenna (e.g., the fourth antenna 644 of FIG. 6 or the fifth antenna 645 of FIG. 6) operatively connected to the second communication circuit and configured to output the transmission signal of the second communication or to receive the reception signal of the second communication, and the fourth switch (e.g., the fifth switch 634 of FIG. 6 or the sixth switch 635 of FIG. 6) connected between the second antenna and the second communication circuit to connect one of the front end module or the second antenna to the second communication circuit, wherein the second communication circuit may be configured to control the fourth switch to connect one of the front end module or the second antenna to the second communication circuit based on the frequency band of the transmission signal of the second communication or the reception signal of the second communication.

In the electronic device according to various example embodiments of the disclosure, the fourth switch may be implemented by double poles and double throws (DPDT) including two poles connected to at least one of the transmission port of the second communication or the reception port of the second communication, and two throws connected to at least one of the second antenna and the front end module.

In the electronic device according to various example embodiments of the disclosure, the second antenna may be configured to receive and/or transmit the signal of the remaining frequency band (e.g., 7.25 GHz to 8.24 GHz) excluding the frequency band (e.g., 6.24 GHz to 7.25 GHz) of the signal, being received or output by the first antenna, of the frequency band (e.g., 6.24 GHz to 8.24 GHz) of the second communication.

In the electronic device according to various example embodiments of the disclosure, the second switch may comprise a switch including two throws connected to at least one of the first terminal or the first switch, and one pole connected to the first antenna, and the first communication circuit may be configured to control the second switch to connect the first switch and the first antenna to each other in response to the reception of the request signal.

In the electronic device according to various example embodiments of the disclosure, the amplifier circuit may include the protection circuit configured to block the transmission signal of the second communication, being input to the amplifier, and the protection circuit may be connected between the amplifier and the first switch.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A front end module (FEM) of an electronic device, comprising:
    a first terminal connected to a transmission port for a first communication;
    a second terminal connected to a reception port for the first communication;
    a first amplifier connected to the first terminal;
    an amplifier circuit including a second amplifier and a bypass line connected in parallel to the second amplifier;
    a first switch configured to connect the amplifier circuit to one of the second terminal, a third terminal connected to one of a reception port or a transmission port for a second communication, or a fourth terminal connected to one of the reception port or the transmission port for the second communication; and a second switch configured to connect an antenna to one of the amplifier circuit or the first amplifier, wherein a transmission signal of the second communication is configured to be transmitted to the antenna through the bypass line connected in parallel to the second amplifier included in the amplifier circuit, and a reception signal of the second communication is configured to be transmitted to the reception port for the second communication through the second amplifier.

2. The front end module of claim 1, wherein the amplifier circuit comprises a protection circuit configured to block the transmission signal of the second communication being input to the second amplifier, and wherein the protection circuit is connected between the second amplifier and the first switch.

3. The front end module of claim 1, wherein the first switch comprises a switch comprising a plurality of throws connected to at least one of the second terminal, the third terminal, or the fourth terminal, and one pole connected to the amplifier circuit.

4. The front end module of claim 1, wherein the second switch is comprises a switch comprising two throws connected to at least one of the first terminal or the first switch, and one pole connected to the antenna.

5. The front end module of claim 1, wherein a frequency band of the first communication partially overlaps a frequency band of the second communication.

6. The front end module of claim 1, wherein the front end module is configured to support reception of a third communication having a frequency band partially overlapping a frequency band of the first communication, and wherein the third terminal or the fourth terminal is connected to a reception port for the third communication.

7. The front end module of claim 6, wherein the third terminal or the fourth terminal is connected to a third switch configured to be selectively connected to one of the reception port for the second communication or the reception port for the third communication.

8. An electronic device comprising:
a first antenna;
a first communication circuit including a transmission port for a first communication configured to output a transmission signal of the first communication and a reception port for the first communication configured to receive a reception signal of the first communication;
a second communication circuit including a transmission port for a second communication configured to output a transmission signal of the second communication and a reception port for the second communication configured to receive a reception signal of the second communication; and
a front end module electrically connected to the first communication circuit and the first antenna, wherein the front end module includes:
a first terminal connected to the transmission port for the first communication;
a second terminal connected to the reception port for the first communication;
a first switch configured to connect an amplifier circuit to one of the second terminal, a third terminal connected to the reception port for the second communication, or a fourth terminal connected to the transmission port for the second communication;
a second switch configured to connect the first antenna to one of the amplifier circuit or the first terminal;
an amplifier circuit connected between the first switch and the second switch,
wherein a first processor is configured to control the front end module to transmit the transmission signal of the second communication to the first antenna through a bypass line connected in parallel to an amplifier included in the amplifier circuit.

9. The electronic device of claim 8, wherein the first communication circuit is configured to receive a request signal for requesting transmission of the transmission signal of the second communication from the second communication circuit, and wherein the first communication circuit is configured to control the amplifier circuit to activate the bypass line in response to the reception of the request signal.

10. The electronic device of claim 9, wherein the first communication circuit is configured to control the amplifier circuit to deactivate the amplifier as a part of activating the bypass line.

11. The electronic device of claim 10, wherein the first switch comprises a switch comprising a plurality of throws connected to at least one of the second terminal, the third terminal, or the fourth terminal, and one pole connected to the amplifier circuit.

12. The electronic device of claim 11, wherein the first communication circuit is configured to control the first switch to connect the amplifier circuit to a terminal connected to the transmission port of the second communication in response to the reception of the request signal.

13. The electronic device of claim 8, wherein a frequency band of the first communication partially overlaps a frequency band of the second communication.

14. The electronic device of claim 8, wherein the electronic device is configured to support reception of a third communication having a frequency band partially overlapping a frequency band of the first communication, and wherein the third terminal or the fourth terminal is connected to a reception port of the third communication.

15. The electronic device of claim 14, further comprising a third switch configured to connect the first switch to one of the reception port for the second communication or the reception port for the third communication, wherein the first communication circuit is configured to control the third switch in response to the reception of the reception signal of the second communication.

* * * * *